(12) United States Patent
Choi et al.

(10) Patent No.: US 10,714,741 B2
(45) Date of Patent: Jul. 14, 2020

(54) NEGATIVE ELECTRODE ACTIVE MATERIAL AND LITHIUM SECONDARY BATTERY INCLUDING THE SAME

(71) Applicant: LG Chem, Ltd., Seoul (KR)

(72) Inventors: Jung Hyun Choi, Daejeon (KR); Yong Ju Lee, Daejeon (KR); Eun Kyung Kim, Daejeon (KR)

(73) Assignee: LG Chem, Ltd. (KR)

( * ) Notice: Subject to any disclaimer, the term of this patent is extended or adjusted under 35 U.S.C. 154(b) by 190 days.

(21) Appl. No.: 15/746,661

(22) PCT Filed: Apr. 20, 2017

(86) PCT No.: PCT/KR2017/004249
§ 371 (c)(1),
(2) Date: Jan. 22, 2018

(87) PCT Pub. No.: WO2017/204466
PCT Pub. Date: Nov. 30, 2017

(65) Prior Publication Data
US 2018/0219216 A1      Aug. 2, 2018

(30) Foreign Application Priority Data

May 27, 2016 (KR) ........................ 10-2016-0065956

(51) Int. Cl.
*H01M 4/36* (2006.01)
*H01M 4/587* (2010.01)
(Continued)

(52) U.S. Cl.
CPC ............. *H01M 4/366* (2013.01); *H01M 4/13* (2013.01); *H01M 4/133* (2013.01); *H01M 4/134* (2013.01);
(Continued)

(58) Field of Classification Search
CPC ...... H01M 4/134; H01M 4/133; H01M 4/386; H01M 4/1395; H01M 4/1393; H01M 4/366
See application file for complete search history.

(56) References Cited

U.S. PATENT DOCUMENTS

2009/0297945 A1  12/2009  Hwang et al.
2010/0136432 A1   6/2010  Kim
(Continued)

FOREIGN PATENT DOCUMENTS

CN      103022446 A    4/2013
CN      103107335 A    5/2013
(Continued)

OTHER PUBLICATIONS

International Search Report From PCT/KR2017/004249 dated Jul. 24, 2017.
(Continued)

*Primary Examiner* — Imran Akram
(74) *Attorney, Agent, or Firm* — Lerner, David, Littenberg, Krumholz & Mentlik, LLP

(57) ABSTRACT

The present invention relates to a silicon-carbon-based composite negative electrode active material, and a negative electrode for a secondary battery and a lithium secondary battery including the same, and particularly to a silicon-carbon-based composite negative electrode active material, in which physical stability is improved by including a carbon-based core capable of intercalating and deintercalating lithium ions and at least one silicon particle included in the carbon-based core and disposed in the form of being distributed in an outer portion of the carbon-based core, and a negative electrode for a secondary battery and a lithium secondary battery in which life characteristics are improved by including the same.

16 Claims, 1 Drawing Sheet

(51) Int. Cl.
  *H01M 4/38*       (2006.01)
  *H01M 10/0525*    (2010.01)
  *H01M 10/052*     (2010.01)
  *H01M 4/62*       (2006.01)
  *H01M 4/13*       (2010.01)
  *H01M 4/1395*     (2010.01)
  *H01M 4/133*      (2010.01)
  *H01M 4/1393*     (2010.01)
  *H01M 4/134*      (2010.01)
  *H01M 4/02*       (2006.01)

(52) U.S. Cl.
  CPC ....... *H01M 4/1393* (2013.01); *H01M 4/1395* (2013.01); *H01M 4/36* (2013.01); *H01M 4/38* (2013.01); *H01M 4/386* (2013.01); *H01M 4/587* (2013.01); *H01M 4/62* (2013.01); *H01M 10/052* (2013.01); *H01M 10/0525* (2013.01); *H01M 2004/027* (2013.01)

(56) References Cited

U.S. PATENT DOCUMENTS

| | | | |
|---|---|---|---|
| 2010/0279172 A1 | 11/2010 | Hwang et al. | |
| 2011/0051322 A1 | 3/2011 | Pushparaj et al. | |
| 2011/0104551 A1* | 5/2011 | Yang | H01M 4/133 429/149 |
| 2011/0309310 A1* | 12/2011 | Koller | H01M 4/58 252/502 |
| 2012/0264020 A1 | 10/2012 | Burton et al. | |
| 2013/0089784 A1 | 4/2013 | Cho et al. | |
| 2013/0234674 A1 | 9/2013 | Nazri | |
| 2014/0248543 A1 | 9/2014 | Zhu et al. | |
| 2015/0004482 A1* | 1/2015 | Gardner | H01M 4/38 429/199 |
| 2015/0072240 A1* | 3/2015 | Yoo | H01M 4/386 429/231.8 |
| 2015/0243969 A1 | 8/2015 | Ku et al. | |
| 2016/0006034 A1* | 1/2016 | Tanaka | H01G 11/24 429/231.4 |
| 2016/0060125 A1* | 3/2016 | Chung | H01M 4/587 429/231.8 |

FOREIGN PATENT DOCUMENTS

| | | |
|---|---|---|
| KR | 20100062083 A | 6/2010 |
| KR | 20100118825 A | 11/2010 |
| KR | 10-1025278 B1 | 3/2011 |
| KR | 20140101640 A | 8/2014 |
| KR | 10-1479320 B1 | 1/2015 |
| KR | 20150014329 A | 2/2015 |
| KR | 20150101310 A | 9/2015 |
| KR | 20160057255 A | 5/2016 |

OTHER PUBLICATIONS

Extended European Search Report including Written Opinion for Application No. EP17802985.6 dated Mar. 22, 2018.
Chinese Search Report for Application No. 201780002604.1, dated Apr. 9, 2020, pp. 1-2.

* cited by examiner

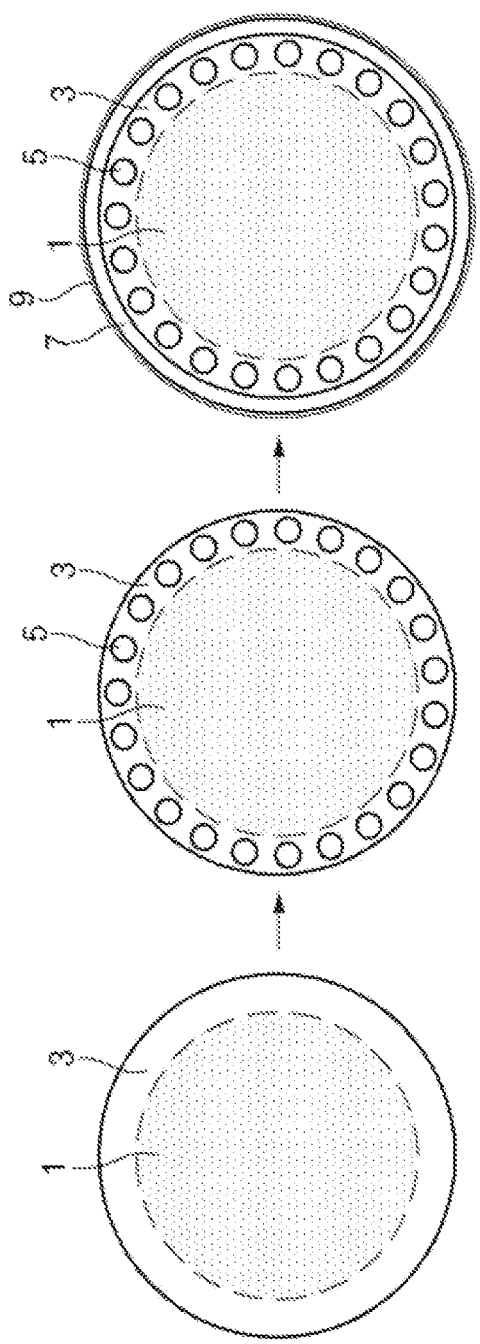

NEGATIVE ELECTRODE ACTIVE MATERIAL AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2017/004249, filed Apr. 20, 2017, which claims priority to Korean Patent Application No. 10-2016-0065956, filed May 27, 2016, the disclosures of which are incorporated herein by reference.

TECHNICAL FIELD

The present invention relates to a negative electrode active material and a lithium secondary battery including the same, and more particularly, to silicon-carbon-based composite negative electrode active material and a lithium secondary battery including the same.

BACKGROUND ART

Recently, in line with miniaturization, lightweight, thin profile, and portable trends in electronic devices according to the development of information and telecommunications industry, the need for high capacity and long life batteries used as power sources of such electronic devices has increased. Since a lithium secondary battery, specifically, a lithium ion battery (LIB) has high energy density and its design is easy, the lithium ion battery has been adopted as a powder source of many portable devices.

Recently, research into positive electrode active materials and negative electrode active materials having high capacity and improved cycle life characteristics as materials for the lithium ion battery has been expanded as the lithium ion battery is adopted as a power source for an electric vehicle or power storage in addition to applications such as portable IT devices.

As the negative electrode active materials, non-carbon-based negative electrode active materials having significantly higher capacity per unit weight than that of typically used carbon have been actively researched.

Among these non-carbon-based negative electrode active materials, a silicon-based composite active material, for example, a Si/C active material is an active material in the form in which a silicon layer is formed on the surface of a carbon-based negative electrode active material, wherein, since it is known to have excellent discharge efficiency (80%) as well as higher capacity than theoretical capacity (about 372 mAh/g) of the carbon-based negative electrode active material, it is in the spotlight as a high-capacity secondary battery material.

However, with respect to a silicon-based active material, since achievable capacity is limited and swelling is large, deformation, such as cracks, occurs in the active material during charge and discharge cycles, and thus, it becomes a cause of degradation of life characteristics due to the cycles of the battery.

Therefore, in order to address such limitations, there is an urgent need to develop a silicon-based negative electrode active material, which may improve discharge capacity, initial efficiency, and output characteristics when used in a lithium secondary battery, and a secondary battery including the same.

DISCLOSURE OF THE INVENTION

Technical Problem

An aspect of the present invention provides a silicon-carbon-based composite negative electrode active material having improved life characteristics.

Another aspect of the present invention provides a negative electrode for a secondary battery in which cycle life characteristic are improved by including the silicon-carbon-based composite negative electrode active material.

Another aspect of the present invention provides a high-capacity lithium secondary battery including the negative electrode.

Technical Solution

According to an aspect of the present invention, there is provided a silicon-carbon-based composite negative electrode active material including:

a carbon-based core capable of intercalating and deintercalating lithium ions; and at least one silicon particle included in the carbon-based core and disposed in a form of being distributed in an outer portion of the carbon-based core.

The at least one silicon particle disposed in the form of being distributed in the outer portion of the carbon-based core may be included in an amount of 5 wt % to 50 wt % based on a total amount of the negative electrode active material.

Also, the negative electrode active material may further include at least one coating layer selected from the group consisting of a silicon-based coating layer and a carbon coating layer.

In this case, the silicon-based coating layer may be included in an amount of 0.01 wt % to 50 wt % based on a total weight of the negative electrode active material.

Also, the carbon coating layer may be included in an amount of 0.01 wt % to 50 wt % based on the total weight of the negative electrode active material.

According to another aspect of the present invention, there is provided a negative electrode including:

a current collector, and an electrode material mixture layer including the silicon-carbon-based composite negative electrode active material of the present invention which is formed on at least one surface of the current collector.

According to another aspect of the present invention, there is provided a lithium secondary battery including:

a positive electrode, a negative electrode, a separator disposed between the positive electrode and the negative electrode, and a non-aqueous electrolyte solution, wherein the negative electrode includes the negative electrode of the present invention.

Advantageous Effects

Since a silicon-carbon-based composite negative electrode active material according to the present invention includes silicon particles in an outer portion of a carbon-based core, the silicon-carbon-based composite negative electrode active material may secure physical stability by preventing cracks of the negative electrode active material generated due to repeated charge and discharge cycles in comparison to an active material in the form in which a silicon layer is only formed on the surface of a typical carbon-based negative electrode active material, and, accordingly, a lithium secondary battery having improved life characteristics and capacity characteristics may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a schematic view of a silicon-carbon-based composite negative electrode active material according to an embodiment of the present invention.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should interpreted as having a meaning that is consistent with their meaning in the context of the relevant art and the technical idea of the invention, based on the principle that an inventor may properly define the meaning of the words or terms to best explain the invention.

Recently, a silicon-based negative electrode active material is proposed as a negative electrode active material of a lithium secondary battery, but the silicon-based negative electrode active material is disadvantageous in that battery performance is degraded by the occurrence of crushing of negative electrode active material particles or the formation of an unstable solid electrolyte interface (SEI) due to its non-conducting properties and a rapid volume change during a charge and discharge process. In particular, with respect to a Si/C composite developed to provide high electrical conductivity to silicon, it has a limitation in that brittle carbon is crushed due to volume expansion of silicon occurring during charge and discharge.

In order to improve the limitation, a method for preparing nano-sized silicon-based powder is being developed, but, since a silicon-based material is oxidized during a milling process, another limitation may occur in which initial efficiency is reduced.

Thus, the present invention aims at providing a silicon-carbon-based composite negative electrode active material, in which capacity and life characteristics as well as physical stability are improved by introducing (doping) a plurality of silicon particles into an outer portion of a carbon-based core, and a negative electrode for a secondary battery and a lithium secondary battery which include the same.

Negative Electrode Active Material

Specifically, in an embodiment of the present invention, provided is a silicon-carbon-based composite negative electrode active material including:

a carbon-based core capable of intercalating and deintercalating lithium ions; and at least one silicon particle included in the carbon-based core and disposed in a form of being distributed in an outer portion of the carbon-based core.

First, in the silicon-carbon-based composite negative electrode active material of the present invention, the expression "carbon-based" in the carbon-based core capable of intercalating and deintercalating lithium ions denotes that at least about 50 wt % or more of carbon is included. For example, the carbon-based core may include at least about 60 wt % or more, 70 wt % or more, 80 wt % or more, and particularly 90 wt % or more of carbon, or may be composed of 100 wt % of a carbon material.

According to an embodiment of the present invention, the carbon-based core may include a single material selected from the group consisting of natural graphite, artificial graphite, graphite, graphitizable carbon (soft carbon), non-graphitizable carbon (hard carbon), carbon black, and graphite oxide, or a mixture of two or more thereof. Specifically, the carbon-based core of the present invention may be formed of natural graphite.

Also, an average particle diameter of the carbon-based core is not particularly limited, but, in a case in which the average particle diameter of the carbon-based core is excessively small, since reactivity with an electrolyte solution is high, cycle life characteristics may be degraded, and, in a case in which the average particle diameter is excessively large, dispersion stability may be reduced during the formation of a negative electrode slurry and a surface of a negative electrode may be rough. Specifically, the average particle diameter of the carbon-based core may be in a range of 5 μm to 30 μm, for example, 10 μm to 20 μm.

In this case, the carbon-based core may have a concentration gradient in which porosity is gradually increased from the center of the core to the outer portion (surface) of the core.

First, the outer portion of the carbon-based core denotes a portion having a length of about 5% to about 50%, for example, about 5% to about 30% of a total length from the center of the carbon-based core to the surface of the carbon-based core in a depth direction from the surface.

Also, in the silicon-carbon-based composite negative electrode active material of the present invention, a pore ratio of the center of the carbon-based core:the outer portion of the carbon-based core may be in a range of 10 vol %:20 vol % to 10 vol %:50 vol %. Furthermore, pores present in the outer portion of the carbon-based core may be included in an amount of about 30 vol % to about 80 vol % in a total volume of the outer portion to facilitate the introduction of silicon nanoparticles.

Also, in the silicon-carbon-based composite negative electrode active material of the present invention, the pores included in the outer portion of the carbon-based core may include at least one silicon particle.

The silicon particle may be only formed in the pores included in the outer portion of the carbon-based core, and may not be present in the center of the core.

The at least one silicon particle disposed in the form of being distributed in the outer portion of the carbon-based core may include a single material selected from the group consisting of a crystalline or amorphous silicon (Si) single phase, $SiO_x$ (0<x≤2), and a Si—Z alloy (where Z includes alkali metal, alkaline earth metal, a Group 13 element, a Group 14 element, transition metal, a rare earth element, or a combination thereof, and is not Si), or a mixture of two or more thereof.

The at least one silicon particle disposed in the form of being distributed in the outer portion of the carbon-based core may have a diameter of 150 nm or less, for example, 20 nm to 100 nm.

In a case in which the diameter of the silicon particle is greater than 150 nm, cracks may occur in the silicon nanoparticle during the charge and discharge, and, in a case in which the diameter of the silicon particle is less than 20 nm, preparation may be difficult.

Furthermore, the at least one silicon particle disposed in the form of being distributed in the outer portion of the carbon-based core may be included in an amount of 5 wt % to 50 wt % based on a total amount of the negative electrode active material.

In a case in which the amount of the silicon particle is less than 5 wt %, a capacity improvement effect is insignificant, and, in a case in which the amount of the silicon particle is greater than 50 wt %, swelling may largely occur to damage the carbon-based core.

Also, the silicon-carbon-based composite negative electrode active material of the present invention may further selectively include at least one coating layer selected from the group consisting of a silicon-based coating layer and a carbon coating layer.

The silicon-based coating layer denotes one including at least about 50 wt % of silicon (Si), and, for example, may include at least about 70 wt %, particularly, about 90 wt % or more of Si, or may be composed of 100 wt % of Si. Specifically, the silicon layer may be a silicon single phase such as Si, and, in addition, the silicon layer may include a material selected from $SiO_x$ ($0<x\leq2$), an alloy, such as Si—Z, (where S includes alkali metal, alkaline earth metal, a Group element, a Group 14 element, transition metal, a rare earth element, or a combination thereof, and is not Si), and a combination thereof. The element Z may be selected from the group consisting of magnesium (Mg), calcium (Ca), strontium (Sr), barium (Pa), radium (Ra), scandium (Sc), yttrium (Y), lanthanum (La), titanium (Ti), zirconium (Zr), hafnium (Hf), vanadium (V), niobium (Nb), tantalum (Ta), chromium (Cr), molybdenum (Mo), tungsten (W), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), zinc (Zn), cadmium (Cd), boron (B), germanium (Ge), phosphorus (P), arsenic (As), antimony (Sb), bismuth (Bi), sulfur (S), selenium (Se), tellurium (Te), polonium (Po), and a combination thereof.

The silicon-based coating layer may be included in an amount of 0.01 wt's to 50 wt %, for example, 0.01 wt % to 20 wt % based on a total weight of the negative electrode active material.

In a case in which the amount of the silicon-based coating layer is greater than 50 wt %, a non-uniform silicon-based coating layer may be formed. That is, in a case in which the amount of the silicon-based coating layer is within the above range, the negative electrode active material including the coating layer may maintain high capacity by reducing large volume changes of the core during the charge and discharge. It is best that a thickness of the coating layer is uniformly maintained over an entire surface area of the core, but the effects of the present invention may be achieved even if there is a variation of the thickness or the coating layer is formed only on a portion of the surface of the core.

Furthermore, the carbon coating layer may be formed of amorphous carbon or a conductive polymer. For example, the conductive polymer may be selected from the group consisting of a vinyl-based resin, a phenol-based resin, a cellulose-based resin, a pitch-based resin, and a tar-based resin.

The carbon coating layer may be included in an amount of 0.01 wt % to 50 wt %, for example, 0.01 wt % to 20 wt % based on the total weight of the negative electrode active material. The negative electrode active material including the carbon coating layer may have an effect of further improving ionic conductivity.

The silicon-carbon-based composite negative electrode active material of the present invention may have an average particle diameter (D50) of 6 μm to 55 μm.

In a case in which the average particle diameter of the negative electrode active material is within the above range, stress of the silicon particles due to the volume expansion occurring during the charge and discharge of the negative electrode active material may be reduced, reversible capacity may be increased, the volume expansion during a reaction with lithium may be suppressed, and thus, the cycle life characteristics is improved. That is, in a case in which the average particle diameter of the negative electrode active material is less than 6 μm, a specific surface area is excessively increased to cause a loss of the reversible capacity. In a case in which the average particle diameter of the negative electrode active material is greater than 55 μm, there are difficulties in the preparation of the electrode, and rolling is difficult.

Also, the negative electrode active material may have a specific surface area (Brunauer-Emmett-Teller (BET)) of 0.5 $m^2$/g to 20 $m^2$/g.

In this case, if the specific surface area is greater than 20 $m^2$/g, since lithium ions are consumed due to an irreversible reaction of the electrolyte solution and the lithium ions on the surface of the active material during the charge and discharge, it may be a cause of initial efficiency reduction.

A schematic view of the negative electrode active material of the present invention is as illustrated in FIG. 1.

Specifically, as illustrated in FIG. 1, in the negative electrode active material of the present invention, a core 1 formed of a carbon-based active material may be disposed at the center, and at least one silicon particle 5 may be disposed in an outer portion 3 of the carbon-based core. Also, at least one coating layer selected from the group consisting of a silicon-based coating layer and a carbon coating layer 9 may be further selectively formed on a surface of the carbon-based core 1.

As described above, in the negative electrode active material of the present invention, the porosity of the outer portion is higher than that of the center of the core, and at least one silicon particle may be included in the pores disposed in the outer portion of the core. As a result, since the silicon particles are not present in the center of the core, the carbon-based active material of the core remains even after the charge and discharge, but the capacity improvement effect may be increased by the silicon particles disposed in the outer portion of the surface of the carbon-based active material core. Also, in a case in which the silicon-based coating layer and the carbon coating layer are selectively formed on the surface of the core, since a continuous exposure of an interface of the core to an electrolyte is prevented, the physical stability may be secured. Thus, a secondary battery having more improved life characteristics may be prepared.

In the silicon-carbon-based composite negative electrode active material of the present invention, the carbon-based core having a concentration gradient, in which a concentration of the porosity is gradually increased from the center of the core to the outer portion (surface) of the core, may be prepared by using ① a method of expanding and exfoliating a portion of the outer portion of spheroidized natural graphite by an acid treatment of the graphite or ② a method of disposing a metal catalyst on the graphite, growing graphene, and then removing the metal catalyst.

Furthermore, a method of introducing at least one silicon particle into the outer portion of the carbon-based core may be performed by using a method such as ① depositing silicon nanoparticles through a chemical vapor deposition method, ② mixing silicon nanoparticles and graphite having increased porosity of the outer portion in a sucrose aqueous solution and then drying the mixture to introduce the silicon nanoparticles, or ③ disposing silicon nanoparticles and a catalyst on the surface of a graphite core and then growing graphene thereon.

Also, in the silicon-carbon-based composite negative electrode active material of the present invention, at least one coating layer of a silicon-based coating layer and a carbon coating layer may be further selectively formed on the surface of the negative electrode active material.

In this case, the silicon-based coating layer may be formed by flowing silane gas.

Also, the carbon coating layer may be formed by a carbon (C) coating method using chemical vapor deposition (CVD) or a C coating method through pitch sintering, and, after the forming of the carbon coating layer, sintering, in which a heat treatment is performed in a temperature range of 600° C. to 1,100° C., may be further performed.

In addition, the carbon coating layer may also be formed by a method including coating the surface of the core including the plurality of coating layers with at least one polymer selected from the group consisting of a vinyl-based resin, a phenol-based resin, cellulose-based resin, a pitch-based resin, and a tar-based resin, and then performing a heat treatment.

Negative Electrode and Secondary Battery Including the Same

Also, in an embodiment of the present invention, provided is a negative electrode including a current collector, and the silicon-carbon-based composite negative electrode active material of the present invention formed on at least one surface of the current collector.

The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, or silver, or an aluminum-cadmium alloy may be used.

The current collector may typically have a thickness of 3 μm to 500 μm and may have a surface with fine roughness to improve bonding strength with the negative electrode active material. The negative electrode collector may be used in various shapes, for example, a film, a sheet, a foil, a net, a porous body, a foam body, or a non-woven fabric body.

Furthermore, the negative electrode active material may be configured by further selectively including a conductive agent, a binder, and a filler.

The conductive agent is not particularly limited so long as it has high conductivity without causing adverse chemical changes in the battery, and conductive materials, for example, graphite such as natural graphite and artificial graphite; a carbon-based material such as carbon black, acetylene black, Ketjen black, channel black, furnace black, lamp black, and thermal black; conductive fibers such as carbon fibers or metal fibers; metal powder, such as fluorinated carbon powder, aluminum powder, and nickel powder; conductive whiskers such as zinc oxide whiskers and potassium titanate whiskers; conductive metal oxide such as titanium oxide; or polyphenylene derivatives may be used.

The conductive agent may typically be included in an amount of 1 wt % to 30 wt % based on a total weight of a mixture including the negative electrode active material.

The binder is not particularly limited so long as it is a component that assists in the binding between the active material and the conductive agent and in the binding with the current collector, and examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber, a fluoro rubber, various copolymers, and the like.

The binder may typically be included in an amount of 1 wt % to 30 wt % based on the total weight of the mixture including the negative electrode active material.

The filler, as a component inhibiting the expansion of the electrode, may be selectively used if necessary, and, is not particularly limited so long as it is a fibrous material that does not cause adverse chemical changes in the battery. For example, olefin-based polymers such as polyethylene and polypropylene; and fibrous materials, such as glass fibers and carbon fibers, may be used as the filler.

Also, in an embodiment of the present invention, provided is a lithium secondary battery including a positive electrode, a negative electrode, a separator disposed between the positive electrode and the negative electrode, and a non-aqueous electrolyte solution, wherein the negative electrode includes the negative electrode of the present invention.

The positive electrode may be prepared by a typical method known in the art, for example, coating a current collector of a metallic material with a positive electrode active material slurry, compressing, and then drying the coated current collector.

In this case, the positive electrode active material slurry may be configured by further selectively including a conductive agent, a binder, and a filler as well as a positive electrode active material.

Typical examples of the positive electrode active material may include a single material selected from the group consisting of $LiCoO_2$, $LiNiO_2$, $LiMnO_2$, $LiMn_2O_4$, $Li(Ni_aCo_bMn_c)O_2$ (where $0<a<1$, $0<b<2$, $0<c<2$, and $a+b+c=2$), $LiMn_{2-z}Ni_zO_4$, and $LiMn_{2-z}Co_zO_4$ (where $0<z<2$), or a mixture of two or more thereof.

As the conductive agent and the binder, the same as or different from those used in the negative electrode active material may be used.

Furthermore, the positive electrode active material slurry may include an organic solvent, such as N-methylpyrrolidone (NMP), dimethylformamide (DMF), acetone, and dimethylacetamide, or water. An amount of the solvent may be sufficient if the solvent may dissolve or disperse the electrode active material, the binder, and the conductive agent in consideration or a coating thickness of the electrode active material slurry and manufacturing yield.

Also, the positive electrode collector is a metal having high conductivity, wherein any metal may be used as long as it does not have reactivity within a voltage range of the battery while the active material slurry may be easily bonded thereto, and, non-limiting examples of the positive electrode collector may be aluminum, nickel, or foils manufactured by a combination thereof.

Furthermore, the negative electrode may further include a conventional general negative electrode active material in addition to the above-described negative electrode active material of the present invention. The conventional general negative electrode active material may be used in the negative electrode in the art, wherein any negative electrode active material may be used as long as it may intercalate and deintercalate lithium ions.

Also, the separator is disposed between the positive electrode and the negative electrode, and an insulating porous thin film having high ion permeability and mechanical strength may be used as the separator. Specifically, an olefin-based polymer such as chemical resistant and hydrophobic polypropylene; and a sheet or nonwoven fabric formed of glass fibers or polyethylene may be used as the separator, and a pore diameter of the separator may be generally in a range of 0.01 μm to 10 μm, and a thickness thereof may be generally in a range of 5 μm to 300 μm.

The non-aqueous electrolyte solution is composed of an electrolyte solution and a lithium salt, and a non-aqueous organic solvent or an organic solid electrolyte may be used as the electrolyte solution.

Typical examples of the non-aqueous organic solvent may be an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may be a polyethylene derivative, a polyethylene oxide derivative, a polypropylene oxide derivative, a phosphate ester polymer, poly agitation lysine, polyester sulfide, polyvinyl alcohol, polyvinylidene fluoride, and a polymer containing an ionic dissociation group.

The lithium salt is a material that readily soluble the non-aqueous electrolyte and, for example, may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Also, in order to improve charge/discharge characteristics and flame retardancy, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride, for example, may be added to the electrolyte solution. In some cases, halogen-containing solvents, such as carbon tetrachloride and ethylene trifluoride, may be further included in order to impart incombustibility, and carbon dioxide gas may be further included in order to improve high-temperature storage characteristics.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Carbon-Based Core Preparation)

20 g of spheroidized natural graphite having an average particle diameter (D50) of 15 μm was immersed in 3 M sulfuric acid for 30 minutes to expand a surface of an outer layer of the graphite.

Subsequently, the surface-expanded natural graphite was filtered and recovered from the sulfuric acid, and then washed several times using distilled water. Next, the surface-expanded natural graphite was dried in an oven at 50° C. for 8 hours to prepare a graphite core in which a pore ratio of the center to an outer portion was 10:40 (amount of pores in the outer portion of 70 vol %).

(Silicon Particle Introduction)

The surface-expanded graphite core and 5 g of silicon nanoparticles having a diameter of 100 nm were added to a sucrose aqueous solution and stirred for 8 hours so that the silicon nanoparticles were allowed to be introduced into the pores present in the outer portion of the graphite.

Subsequently, the sucrose aqueous solution was filtered and removed, and the product thus obtained was then washed using distilled water and dried in an oven at 60° C. for hours to prepare a negative electrode active material composed of a natural graphite core (20 g) in which the silicon nanoparticles (5 g) were introduced into the outer portion.

Example 2

(Silicon-Based Coating Layer Formation)

The negative electrode active material prepared in Example 1 was added to a chemical vapor deposition chamber, and silane gas was flowed therein to deposit a silicon-based coating layer on a surface of the negative electrode active material. The silicon-based coating layer may be included in an amount of 10 wt % based on a total weight of the negative electrode active material.

Example 3

(Carbon Coating Layer Formation)

The negative electrode active material including the silicon-based coating prepared in Example 2 and 10 parts by weight of pitch, as a carbon precursor, based on 100 parts by weight of the total negative electrode active material were mixed and sintered at 800° C. to prepare a negative electrode active material including a carbon coating layer. The carbon coating layer may be included in an amount of 10 wt % based on the total weight of the negative electrode active material.

Example 4: Preparation of Coin-Type Half Cell

The negative electrode active material of Example 1, graphite having a particle diameter of 30 nm as a conductive agent, and styrene-butadiene rubber (SER) and carboxymethylcellulose (CMC), as a binder, were mixed at a weight ratio of 95.8:1:1.5:1.7 and the mixture was mixed with water ($H_2O$), as a solvent, to prepare a uniform negative electrode active material slurry.

Subsequently, a 10 μm thick copper (Cu) thin film, as a negative electrode collector, was coated with the negative electrode active material slurry, dried, and roll-pressed to prepare a negative electrode.

Also, lithium (Li) metal was used as a counter electrode, a polyolefin separator was disposed between the negative electrode and the Li metal, and a coin-type half cell (CR2032 type) was then prepared by injecting an electrolyte in which 1 M $LiPF_6$ was dissolved in a solvent prepared by mixing ethylene carbonate (EC) and diethyl carbonate (DEC) at a volume ratio of 30:70.

Example 5: Preparation of Coin-Type Half Cell

A coin-type half cell (CR2032 type) was prepared in the same manner as in Example 1 except that the negative electrode active material of Example 2 was used instead of the negative electrode active material of Example 1.

Example 6: Preparation of Coin-Type Half Cell

A coin-type half cell (CR2032 type) was prepared in the same manner as in Example 1 except that the negative electrode active material of Example 3 was used instead of the negative electrode active material of Example 1.

Comparative Example 1: Preparation of Coin-Type Half Cell (Silicon-Based Coating Layer Formation)

General spheroidized natural graphite having an average particle diameter (D50) of 15 μm, instead of the graphite core of Example 1 in which silicon nanoparticles were introduced thereinto, was added to chemical vapor deposition chamber, and silane gas was flowed therein to deposit a silicon-based coating layer on a surface of the negative electrode active material. The silicon-based coating layer may be included in an amount of 10 wt % based on a total weight of the negative electrode active material.

(Negative Electrode Preparation)

The negative electrode active material having the silicon-based coating layer formed thereon, graphite having a particle diameter of 30 nm as a conductive agent, and styrene-butadiene rubber (SBR) and carboxymethylcellulose (CMC), as a binder, were mixed at a weight ratio of 95.8:1:1.5:1.7 and the mixture was mixed with water ($H_2O$), as a solvent, to prepare a uniform negative electrode active material slurry.

Subsequently, a 10 μm thick copper (Cu) thin film, as a negative electrode collector, was coated with the negative electrode active material slurry, dried, and roll-pressed to prepare a negative electrode.

(Coin-Type Half Cell Preparation)

lithium (Li) metal was used as a counter electrode, a polyolefin separator was disposed between the negative electrode and the Li metal, and a coin-type half cell (CR2032 type) was then prepared by injecting an electrolyte in which 1 M $LiPF_6$ was dissolved in a solvent prepared by mixing ethylene carbonate (EC) and diethyl carbonate (DEC) at a volume ratio of 30:70.

Comparative Example 2: Preparation of Coin-Type Half Cell (Carbon Coating Layer Formation)

The negative electrode active material including the silicon-based coating prepared in Comparative Example 1 and 10 parts by weight of pitch, as a carbon precursor, based on 100 parts by weight of the total negative electrode active material were mixed and sintered at 800° C. to prepare a negative electrode active material including a carbon coating layer. The carbon coating layer may be included in an amount of 10 wt % based on the total weight of the negative electrode active material.

(Negative Electrode Preparation)

The negative electrode active material having the carbon coating layer formed thereon, graphite having a particle diameter of 30 nm as a conductive agent, and styrene-butadiene rubber (SBR) and carboxymethylcellulose (CMC), as a binder, were mixed at a weight ratio of 93.8:1:1.5:1.7 and the mixture was mixed with water ($H_2O$), as a solvent, to prepare a uniform negative electrode active material slurry.

Subsequently, a 10 μm thick copper (Cu) thin film, as a negative electrode collector, was coated with the negative electrode active material slurry, dried, and roll-pressed to prepare a negative electrode.

(Coin-Type Half Cell Preparation)

lithium (Li) metal was used as a counter electrode, a polyolefin separator was disposed between the negative electrode and the Li metal, and a coin-type half cell (CR2032 type) was then prepared by injecting an electrolyte in which 1 M $LiPF_6$ was dissolved in a solvent prepared by mixing ethylene carbonate (EC) and diethyl carbonate (DEC) at a volume ratio of 30:70.

Experimental Examples

Experimental Example 1: Measurement of Initial Efficiency and Charge and Discharge Capacity of Lithium Secondary Battery The coin-type half cells prepared in Examples 4 to 6 and Comparative Examples 1 and 2 were charged at a constant current (CC) of 0.1 C to a voltage of 5 mV under constant current/constant voltage (CC/CV) conditions and then charged at a constant voltage (CV) until the current reached 0.005 C to measure charge capacities in the first cycle. Thereafter, after the half cells were left standing for 20 minutes, the half cells were subsequently discharged at a constant current of 0.1 C to a voltage of 1.5 V to measure initial efficiencies and discharge capacities. The results thereof are presented in Table 1 below.

TABLE 1

| | Initial efficiency | Charge and discharge capacity |
|---|---|---|
| Example 4 | 90.3 | 505 |
| Example 5 | 91 | 530 |
| Example 6 | 92.5 | 550 |
| Comparative Example 1 | 90 | 495 |
| Comparative Example 2 | 90.5 | 510 |

As illustrated in Table 1, it was confirmed that, with respect to the cell of Example 5, initial efficiency was increased by about 1% and discharge capacity was increased by about 35 mAh/g, in comparison to the cell of Comparative Example 1. Also, it was confirmed that, with respect to the cell of Example 6, initial efficiency was increased by about 2% and discharge capacity was increased by about 40 mAh/g, in comparison to the cell of Comparative Example 2.

Experimental Example 2: Life Characteristics and Electrode Thickness Expansion Characteristics of Lithium Secondary Battery The coin-type half cells prepared in Examples 4 to 6 and Comparative Examples 1 and 2 were charged at a constant current (CC) of 0.1 C to a voltage of 5 my under constant current/constant voltage (CC/CV) conditions and then charged at a constant voltage (CV) until the current reached 0.005 C to measure charge capacities in the first cycle. Thereafter, after the half cells were left standing for 20 minutes, the half cells were subsequently discharged at a constant current of 0.1 C to a voltage of 1.5 V to measure initial efficiencies and discharge capacities. Thereafter, after the half cells were left standing for 20 minutes, a cycle, in which the half cells were charged at 0.5 C within the same voltage range under constant current/constant voltage (CC/CV) conditions and then discharged at a constant current of 0.5 C, was repeated 50 times to measure life characteristics. After the cycle was repeated 50 times, the coin-type lithium secondary batteries were again charged at 0.5 C and were disassembled to measure negative electrode thickness expansion rates in a fully charged state. The results of the life characteristics and electrode thickness expansion are presented in Table 2 below.

discharge capacity in a 50th cycle discharge capacity in the first cycle×100 Life characteristics calculation formula:

(thickness of charged negative electrode in a 51th cycle−initial negative electrode thickness before battery assembly)÷(initial negative electrode thickness before battery assembly−current collector thickness)×100
Electrode thickness expansion rate calculation formula:

TABLE 2

|  | Life characteristics (%) | Electrode thickness expansion rate (%) |
| --- | --- | --- |
| Example 4 | 89.5 | 83 |
| Example 5 | 92 | 84 |
| Example 6 | 93 | 84 |
| Comparative Example 1 | 86 | 89 |
| Comparative Example 2 | 88 | 89 |

As illustrated in Table 2, it may be confirmed that, with respect to the cells of Examples 4 to 6 of the present invention, life characteristics were improved by about 3% or more in comparison to the cells of Comparative Examples 1 and 2. Also, it may be confirmed that electrode thickness expansion rates of the cells of Examples 4 to 6 in a charged state in the final cycle were improved (reduced) by about 5% or more in comparison to the cells of Comparative Examples 1 and 2.

The invention claimed is:

1. A silicon-carbon-based composite negative electrode active material comprising:
   a carbon-based core capable of intercalating and deintercalating lithium ions; and
   at least one silicon particle included in the carbon-based core and disposed in a form of being distributed in an outer portion of the carbon-based core,
   wherein the carbon-based core comprises a carbon material selected from the group consisting of natural graphite, artificial graphite, graphite, graphitizable carbon, non-graphitizable carbon, carbon black, and graphite oxide, or a mixture of two or more thereof, and
   wherein the outer portion of the carbon-based core is a portion having a length of 10% to 50% of a total length from the center of the carbon-based core to a surface of the carbon-based core in a depth direction from the surface,
   wherein the outer portion comprises at least some of the carbon material and the silicon particle(s),
   wherein the carbon-based core has a concentration gradient in which porosity is gradually increased from a center at the core to the outer portion of the core.

2. The silicon-carbon-based composite negative electrode active material of claim 1, wherein an average particle diameter of the carbon-based core is in a range of 5 μm to 30 μm.

3. The silicon-carbon-based composite negative electrode active material of claim 1, wherein a pore ratio of the center of the carbon-based core:the outer portion of the carbon-based core is in a range of 10 vol %:20 vol % to 10 vol %:50 vol %.

4. The silicon-carbon-based composite negative electrode active material of claim 1, wherein the at least one silicon particle disposed in the form of being distributed in the outer portion of the carbon-based core comprises a single material selected from the group consisting of a crystalline or amorphous silicon (Si) single phase, $SiO_x$ (0<x≤2), and a Si—Z alloy (where Z comprises alkali metal, alkaline earth metal, a Group 13 element, a Group 14 element, transition metal, a rare earth element, or a combination thereof, and is not Si), or a mixture of two or more thereof.

5. The silicon-carbon-based composite negative electrode active material of claim 1, wherein the at least one silicon particle disposed in the form of being distributed in the outer portion of the carbon-based core has a diameter of 20 nm to 100 nm.

6. The silicon-carbon-based composite negative electrode active material of claim 1, wherein the at least one silicon particle disposed in the form of being distributed in the outer portion of the carbon-based core is included in an amount of 5 wt % to 50 wt % based on a total amount of the negative electrode active material.

7. The silicon-carbon-based composite negative electrode active material of claim 1, wherein the negative electrode active material further comprises at least one coating layer selected from the group consisting of a silicon-based coating layer and a carbon coating layer.

8. The silicon-carbon-based composite negative electrode active material of claim 7, wherein the silicon-based coating layer is formed of a single material selected from the group consisting of a crystalline or amorphous silicon (Si) single phase, $SiO_x$ (0<x≤2), and a Si—Z alloy (where Z comprises alkali metal, alkaline earth metal, a Group 13 element, a Group 14 element, transition metal, a rare earth element, or a combination thereof, and is not Si), or a mixture of two or more thereof.

9. The silicon-carbon-based composite negative electrode active material of claim 7, wherein the silicon-based coating layer is included in an amount of 0.01 wt % to 50 wt % based on a total weight of the negative electrode active material.

10. The silicon-carbon-based composite negative electrode active material of claim 7, wherein the carbon coating layer is formed of amorphous carbon or a conductive polymer.

11. The silicon-carbon-based composite negative electrode active material of claim 7, wherein the carbon coating layer is included in an amount of 0.01 wt % to 50 wt % based on a total weight of the negative electrode active material.

12. The silicon-carbon-based composite negative electrode active material of claim 1, wherein the negative electrode active material has an average particle diameter (D50) of 6 μm to 55 μm.

13. The silicon-carbon-based composite negative electrode active material of claim 1, wherein the negative electrode active material has a specific surface area (Brunauer-Emmett-Teller (BET)) of 0.5 m$^2$/g to 20 m$^2$/g.

14. A negative electrode comprising:
a current collector; and
an electrode material mixture layer including the silicon-carbon-based composite negative electrode active material of claim 1 which is formed on at least one surface of the current collector.

15. The negative electrode of claim 14, wherein the electrode material mixture layer further comprises at least one additive selected from the group consisting of a conductive agent, a binder, and a filler.

16. A lithium secondary battery comprising:
a positive electrode;
a negative electrode;
a separator disposed between the positive electrode and the negative electrode; and
a non-aqueous electrolyte solution,
wherein the negative electrode comprises the negative electrode of claim 14.

* * * * *